Patented July 25, 1944

2,354,554

UNITED STATES PATENT OFFICE 2,354,554

PROCESS FOR PREPARING DERIVATIVES OF ACID SLUDGES

Jere C. Showalter, Goose Creek, and Mehemet Wiggen, Baytown, Tex., assignors to Standard Oil Development Company, a corporation of Delaware No Drawing. Original application September 1, 1939, Serial No. 293,050. Divided and this application December 31, 1941, Serial No. 425,036

6 Claims. (Cl. 196—34)

This invention relates to improvements in products obtained from hydrocarbon oil acid sludge and more particularly from the sludges obtained on treating cracked hydrocarbon naphthas with sulfuric acid.

This is a divisional case of patent application Serial No. 293,050, filed September 1, 1939.

It is well known that hydrocarbon oil acid sludges that are separated from the hydrocarbon oils contain substantial amounts of hydrocarbons together with the spent sulfuric acid. These hydrocarbon oil acid sludges, on dilution with water and maintaining at an elevated temperature, separate into two layers, one a dilute acid layer and the other an oil layer. This oil layer has been further purified by neutralization and fractionation to produce hydrocarbon oils which may be used as drying oils. The objection to this process is that the hydrocarbon oil thus prepared is a dark, discolored oil and even though it is treated with a decolorizing clay, the oil is not suitable for use in paints due to its dark color and incompatibility with lead driers.

An object of this invention is to prepare from hydrocarbon oil acid sludges a drying oil and a resin which may be used in light colored paints and/or varnishes.

According to the preferred embodiment of this invention, a cracked naphtha or a hydrocarbon naphtha that contains a large percentage of unsaturated hydrocarbons is treated with strong sulfuric acid. After the mixture of acid and cracked naphtha is agitated for a sufficient time to complete the reaction of sulfuric acid on the unsaturated or other highly reactive constituents of the cracked naphtha, it is allowed to settle and the acid sludge layer separates to the bottom and is withdrawn from the treated naphtha. This acid sludge is mixed with sufficient water to hydrolyze the esters and is allowed to settle into two layers and the bottom layer of mineral acid is removed.

The upper or oily layer is then neutralized by washing with an aqueous solution of sodium carbonate or other alkali. The washed oil is then mixed with 4 to 5 volumes of propane or other liquefied saturated hydrocarbon compounds that are normally gaseous at ordinary temperature for each volume of the oil and maintained at a temperature of 120° F. for about 30 minutes. A layer of carbonaceous material settles out and is removed. After removal of the propane by vaporization, the decarbonized oil is subjected to fire-and-steam or vacuum distillation and an overhead fraction boiling between about 520° and 650° F. at normal atmospheric pressure is recovered as a crude drying oil. A residue of resin bottoms is withdrawn from the still. The percentage of drying oil distillate varies from 30 to 47 per cent based on the oil separated from cracked naphtha acid sludge.

The drying oil distillate and the resin separately (the latter in naphtha solution) are treated with 50 and 100 pounds of equivalent 98% sulfuric acid per barrel, respectively, at approximately 80° to 90° F. After separating the resulting secondary sludges, the drying oil and the naphtha solution of the resin are contacted separately with a decolorizing clay, such as fuller's earth, Milwhite No. 2 clay, Super Filtrol, etc. In the case of the drying oil, the clay contacting step is carried out with approximately one pound of clay per gallon at about 300° F. for a short period of time ranging up to about 30 minutes. After separation of the clay by filtration, the drying oil can then be used as such or with the addition of a drier, such as lead or manganese naphthenate or oleate, etc. The naphtha solution of resin is contacted with about 2 pounds of clay per gallon of resin (naphtha-free basis) at atmospheric temperature for approximately 30 minutes. The filtered resin solution is then subjected to distillation to remove the naphtha. It may sometimes be desirable to treat the acid-treated drying oil and acid-treated resin with propane before clay treating. The light-colored finished resin may be used in varnish manufacture.

When a maximum yield of drying oil is desired, the original naphtha sludge must be hydrolyzed and neutralized preferably within one or two hours after the formation of the sludge from the naphtha. If the sludge is allowed to remain in the acid state for a relatively long period of time, the drying oil tends to polymerize and form a larger yield of resin than in the above-mentioned instance. When a maximum yield of resin is the desired product, on the other hand, the original naphtha sludge is allowed to remain in the unhydrolyzed state for a relatively long period of time.

If the hydrolyzed sludge containing small percentages of free mineral acid is permitted to remain in contact with this free acid for a relatively long period of time, a tendency for the drying oil to polymerize to resin persists. Consequently, if the free acid is not removed by other means which will be described later, it is preferred to neutralize the hydrolyzed oily layer promptly with aqueous sodium carbonate or other alkali in order to check further polymerization. However, this neutralization step introduces undesirable salts which cannot be removed by simple water washing due to severe emulsion difficulties. Nevertheless, if these salts are not removed prior to the distillation step, they decompose and release sulfur compounds which are corrosive to the distillation equipment and result in the production of drying oils which are incompatible with lead driers.

The objectionable salts and some carbonaceous or asphaltic material can be readily precipitated and removed by dissolving the neutralized oily layer in 4 to 5 volumes of propane or other liquefied normally gaseous hydrocarbon at approximately 120° F. If it is convenient to propane treat the hydrolyzed oily layer immediately, the neutralization step may be omitted. Since propane treatment precipitates the traces of free mineral acid and acidic esters along with the carbonaceous material, polymerization of the crude drying oil is effectively checked and subsequent distillation and refining may be delayed. Whereas considerable quantities of free sulfur begin to be liberated at about 320° F. when distilling non-propane treated, hydrolyzed or neutralized sludge, no harmful quantity of free sulfur or sulfur dioxide is observed during the distillation of propane treated oil.

Although it is preferred to separate during distillation a light fraction boiling below about 520° F. in order that the finished drying oil may conform to certain specifications for commercial drying oils, portions of the lower boiling fraction which also have drying and thinning properties may be included in the finished drying oil.

The crude drying oil distillate is preferably refined by treating it with about 50 pounds of equivalent 98% sulfuric acid per barrel of oil and, after separating the resulting secondary sludge, to contact the acid oil with about one pound of clay per gallon of oil at a temperature of approximately 300° F., in conventional manner. It was found, however, that quantities as low as 15 pounds of acid per barrel can be used to produce a finished oil of desirable color provided the clay dosage is appreciably increased. An oil of desirable color quality cannot be produced economically by simple clay treatment in the absence of a prior acid treat. Variation of the acid treat between the above-mentioned limits does not adversely affect the drying properties of the oil.

The combined drying oil and resin fractions may be acid and clay treated, although the yield of resin is lowered and the color of the drying oil fraction is appreciably decreased over those obtained in the preferred procedure.

It has been shown in the prior art that resins prepared from sludges obtained in the aluminum chloride treatment of cracked naphthas or other highly unsaturated hydrocarbon fractions may be refined by fluxing with a light non-aromatic hydrocarbon fraction and contacting with an activated clay at temperatures in the range of about 200° to 450° F. for short periods of time, on the order of 5 to 10 minutes. This treatment produces some improvement in color of the resins obtained from sulfuric acid sludges of cracked naphthas, but it does not yield as light colored product as does that prepared by this preferred process of removing carbonaceous and acidic material by propane precipitation, acid treating in two volumes of naphtha with about 100 pounds of acid per barrel (unfluxed basis), and contacting with about two pounds of activated or non-activated clay per gallon (unfluxed basis) at room temperature while still in naphtha solution. The following examples clearly illustrate the results of these treatments:

EXAMPLE 1

Cracked naphtha acid sludge was hydrolyzed with water and the oily layer was neutralized with sodium carbonate. After aging this crude material for 16 days, it was decarbonized in four volumes of propane at 120° F., and the depropanized oil was fire-and-steam distilled to a 23.2% resin bottoms. The crude resin had an absolute color of 5040.

EXAMPLE 2

One hundred grams of the crude resin prepared in Example 1 were fluxed with 500 cc. of a narrow-boiling-range, non-aromatic naphtha and 100 grams of Super Filtrol (activated) clay were added. After warming the mixture to 200° F. and agitating for 10 minutes, the clay was filtered out and the naphtha stripped off. The recovered resin had an absolute color of 5100.

EXAMPLE 3

One hundred grams of the crude resin prepared in Example 1 were crushed and mixed with 100 grams of Super Filtrol clay. After heating the mixture to 450° F. and stirring for 5 minutes, it was cooled and fluxed with 500 cc. of non-aromatic naphtha so that the clay could be separated by filtration. The stripped resin had an absolute color of 1370.

EXAMPLE 4

A portion of the crude resin prepared in Example 1 was fluxed with two volumes of a non-aromatic naphtha and treated with 100 pounds of 98% sulfuric acid per barrel based on the unfluxed crude resin. After separating the acid sludge, the fluxed mixture was agitated at 85° F. for 30 minutes with two pounds of Milwhite No. 2 (non-activated) clay per gallon based on the unfluxed acid treated resin. The filtered and stripped product had an absolute color of 584.

In the foregoing examples the "absolute" color of the resin was determined by dissolving a one gram sample of the filtered and naphtha-free, finished resin in a measured volume of water white naphtha sufficient to yield a Robinson color between 9 and 12. The observed color was obtained in a standard Tag-Robinson colorimeter by matching the sample against a No. 2 color disc and reading the scale within the nearest millimeter. This observed color was then converted to absolute units and the latter were multiplied by the number of cubic centimeters of naphtha used for dilution. Conversions of Robinson color to absolute color were obtained from a graph wherein the following are specific points:

| Robinson color | Absolute color |
|---|---|
| 8.5 | 19.00 |
| 9.0 | 10.20 |
| 9.5 | 7.10 |
| 10.0 | 5.48 |
| 10.5 | 4.49 |
| 11.0 | 3.82 |
| 11.5 | 3.33 |
| 12.0 | 2.95 |
| 12.5 | 2.66 |

EXAMPLE 5

The advantages of propane treating in preparing light-colored drying oils and resins from hydrolyzed naphtha acid sludge oil are illustrated in Table I. In case A of Table I, a sample of acid sludge was hydrolyzed and the decanted oily layer was water washed and soda neutralized. The oily material was then fire-and-steam distilled into a heavy naphtha cut, a drying oil distillate and a crude resin bottoms. The drying oil distillate and the crude resin bottoms (the latter in naphtha solution) were subsequently treated with acid and clay for improvement in color. In case B of Table I, a sample of the acid sludge was hydrolyzed and the decanted oily layer was water washed but not neutralized. The resultant hydrolyzed sludge oil was decarbonized by treating with liquid propane. After separating the precipitated asphaltic material and flashing off the propane, the decarbonized oil was fire-and-steam distilled into a heavy naphtha cut, a drying oil distillate and a crude resin bottoms. This drying oil distillate and crude resin bottoms were subjected to acid and clay treatment just as in case A. The finished drying oil and resin of case B are sufficiently light in color to be used in the preparation of light-colored paints and/or light-colored varnishes, whereas the products of case A are too dark in color for such usage.

Table I

| | Cracked naphtha acid sludge | |
|---|---|---|
| | Case A soda neutralized | Case B propane treated |
| Treating conditions for acid sludge: | | |
| Temperature of hydrolysis °F | 160 | 170 |
| Hydrolyzing ratio, sludge to water | 1:1 | 1:1 |
| Treating conditions for hydrolyzed sludge oil: | | |
| Water washing ratio, sludge oil to water | 1:1 | 1:1 |
| Soda for neutralization | (1) | None |
| Decarbonization ratio, propane to sludge oil | | 4:1 |
| Decarbonization temperature °F | | 120 |
| Yield of neutralized or decarbonized oil, per cent hydro. sludge oil | | 79.4 |
| Atmospheric steam distillation of treated sludge oil: | | |
| Still temperature for naphtha cut °F | 320–420 | 220–555 |
| Still temperature for drying oil cut do | 420–650 | 555–650 |
| Yield of naphtha volume per cent | 24.3 | 28.4 |
| Yield of drying oil distillate do | 51.8 | 47.8 |
| Yield of resin bottoms do | 23.9 | 23.8 |
| Treatment, yields and quality of drying oil: | | |
| Pounds 98% $H_2SO_4$ per barrel drying oil distillate | 59.4 | 50 |
| Acid treating temperature °F | 80–90 | 80–90 |
| Yield of acid treated drying oil, hydrolyzed sludge oil volume per cent | 37.7 | 27.6 |
| Pounds non-activated clay per gal. acid oil | 1.0 | 1.0 |
| Temperature of contact °F | 300 | 300 |
| Time of contact minutes | 30 | 30 |
| Yield of clay contacted oil, hydrolyzed sludge oil volume per cent | 33.9 | 26.5 |
| Gravity °A. P. I. | 16.0 | 17.7 |
| Flash °F | 285 | 250 |
| Viscosity at 100° F., Saybolt Universal | 345 | 187 |
| Viscosity at 210° F., Saybolt Universal | 45.7 | 40.4 |
| Color, Robinson | 4 | 7½ |
| Saponification number | 1.54 | 1.6 |
| Acid number (neutralization value) | 0.25 | 0.14 |
| Iodine number | 208 | 293 |
| Carbon residue per cent | 0.4 | 0.22 |
| Sulfur do | 1.2 | 1.3 |
| Drying time, hours exposed to direct sunlight | 4 | 6 |
| Treatment, yields and quality of resin bottoms: | | |
| Fluxing ratio, resin:naphtha | 1:2 | 1:2 |
| Pounds 98% $H_2SO_4$ per barrel resin, (unfluxed basis) | 100 | 100 |
| Pounds non-activated clay per gallon resin (unfluxed basis) | 1.5 | 2.0 |
| Temperature of contact °F | 85 | 85 |
| Time of contact minutes | 30 | 30 |
| Yield of clay-contacted, naphtha-free resin, hydrolyzed sludge oil volume per cent | 20.0 | 11.6 |
| Specific gravity | | 0.991 |
| Absolute color | 2740 | 786 |
| Ring and ball softening point °F | 175 | 186 |

¹ Slight excess.

EXAMPLE 6

In the following Table II, case A illustrates the type of products obtained by a preferred method of making drying oils and resins from hydrolyzed cracked naphtha acid sludge oil. A sample of unneutralized oily material from freshly hydrolyzed cracked naphtha acid sludges was decarbonized by propane treatment and then distilled into a naphtha cut, a drying oil distillate and a crude resin bottoms. The drying oil distillate and the crude resin bottoms (the latter in naphtha solution) were then treated with strong sulfuric acid and subsequently contacted with non-activated clay. Both products were light in color, the drying oil being satisfactory for use in the preparation of light-colored paints and varnishes, and the resin being satisfactory for use in the preparation of light-colored varnishes.

Case B illustrates the impossibility of producing economically a light-colored drying oil without acid treating the crude product. The treating procedure employed in this case differs from that of case A only in the respect that no acid was used on the crude drying oil distillate; instead, an excessively large clay treat was employed in an unsuccessful attempt to decolorize satisfactorily the distillate.

Case C illustrates the type of products obtainable from a hydrolyzed cracked naphtha acid sludge oil which had been neutralized and aged several days before subjecting it to propane, acid and clay treatment in accordance with the procedure of case A. In this particular example, the hydrolyzed acid sludge oil was neutralized with sodium carbonate and allowed to age 16 days prior to completion of the treatment for converting it into a drying oil and a resin.

Table II

| Charge stock | Freshly hydrolyzed cracked naph. acid sludge | | |
|---|---|---|---|
| Case | A | B | C |
| Condition when propane decarbonized | Unneutralized | Unneutralized | Unneutralized |
| Ratio, propane: hydrolyzed sludge | 4:1 | 4:1 | 4:1 |
| Decarbonizing temperature °F | 120 | 120 | 120 |
| Yield of decarbonized oil percent | 79.4 | 79.4 | 87.0 |
| Atmospheric steam still temp. °F. naph. cut | 220-555 | 220-520 | 220-520 |
| Atmospheric steam still temp. °F. drying oil cut | 555-650 | 520-650 | 520-650 |
| Yield of naphtha percent | 22.5 | 23.5 | 25.0 |
| Yield of drying oil distillate do | 38.0 | 36.4 | 41.8 |
| Yield of resin bottoms do | 18.9 | 19.5 | 20.2 |
| Treatment, yields and quality of drying oil: | | | |
| Pounds 98% sulfuric acid/barrel drying oil distillate | 50 | 0 | 50 |
| Yield of acid treated drying oil percent | 32.0 | | 32.5 |
| Pounds non-activated clay/gal. acid oil | 1.0 | 2.0 | 1.0 |
| Contacting temperature °F | 300 | 300 | 300 |
| Time of contact minutes | 30 | 30 | 30 |
| Yield of clay contacted oil percent | 30.8 | 34.2 | 31.2 |
| Gravity, °A.P.I. | 17.7 | 17.7 | 17.1 |
| Flash °F | 250 | 260 | 260 |
| Saybolt viscosity at 100° F seconds | 187 | 214 | 329 |
| Saybolt viscosity at 210° F do | 40.4 | 41.5 | 44.5 |
| Color, Robinson | 7½ | 1¼ | 9+ |
| Saponification number | 1.6 | 0.84 | 0.84 |
| Acid number (neut. value) | 0.14 | 0.2 | 0.14 |
| Iodine number | 293 | 325 | 299 |
| Carbon residue percent | 0.22 | 0.38 | 0.29 |
| Sulfur do | 1.3 | 1.5 | 1.3 |
| Drying time, hours exposed to direct sunlight | 6 | 6 | 6 |
| Treatment, yields and quality of resin bottoms: | | | |
| Ratio, crude resin: naphtha flux | 1:2 | 1:2 | 1:2 |
| Pounds 98% sulfuric acid/barrel resin (unfluxed) | 100 | 100 | 100 |
| Yield of acid treated resin (unfluxed) percent | 14.0 | 14.0 | 14.8 |
| Pounds non-activated clay/gal. resin (unfluxed) | 2.0 | 2.0 | 2.0 |
| Contacting temperature °F | 85 | 85 | 85 |
| Time of contact minutes | 30 | 30 | 30 |
| Yield of clay contacted, naphtha-free resin percent | 13.2 | 13.2 | 13.9 |
| Specific gravity | 0.991 | 0.991 | 0.985 |
| Absolute color | 786 | 786 | 584 |
| Ring-and-ball softening point °F | 185 | 186 | 195 |

NOTE.—All yields calculated on basis of water and acid-free hydrolyzed sludge.

While a specific object of this invention is to prepare from hydrocarbon oil acid sludge a drying oil and a resin which may be used in light-colored paints and/or light-colored varnishes, it is distinctly understood that these products possess properties which make them adaptable for a wide variety of other uses, such as those hereinafter mentioned.

The drying oil may be used in the preparation of paints and varnishes of all kinds, adhesives, putties, printing inks, and waterproofing compounds for brick, tile, stucco, or concrete buildings. It may also be used for waterproofing fabrics, for an adhesive in briquetting, and as a substitute in certain instances for natural drying or semi-drying oils.

The resin may be used in pigmented tiles, floor covering, roofing material, panel boards, moulding powders, and waterproofing compounds for brick, tile, stucco, or concrete walls or floors; furthermore, it may be used in almost all lacquers, varnishes, paints and allied materials, the resin may be used also for electrical insulation, for sizing fabric or paper, as a protective covering for pipe lines, and as an impregnant for improving the appearance, strength and waterproofing qualities of cardboard, fibre board, or wood. In the unrefined state, resins obtained from hydrolyzed cracked naphtha acid sludge oil are particularly well adapted for use in the manufacture of "clay pigeons;" for example, the resins are compounded with spent contact clay which has been used in decolorizing oil and from which the excess oil has been removed.

We claim:

1. A process of preparing derivatives of an acid sludge which comprises treating with water an acid sludge obtained by contacting cracked hydrocarbon naphthas with sulfuric acid to form a layer of aqueous acid solution and an oily layer, removing an aqueous acid solution, treating the oily layer with a liquefied normally gaseous hydrocarbon to form a precipitate, separating the precipitate from the remaining liquid, distilling the remaining liquid to separate the hydrocarbons boiling below about 650° F. from a residual bottom fraction, dissolving the residual bottom fraction in a volatile hydrocarbon oil, treating the resulting solution with sulfuric acid, separating the sulfuric acid sludge formed thereby and contacting the residual solution with clay, separating the clay from the residual solution and distilling off the volatile hydrocarbon oil from said solution.

2. A process of preparing derivatives of an acid sludge which comprises treating with water an acid sludge obtained by contacting cracked hydrocarbon naphthas with sulfuric acid to form a layer of aqueous solution and an oily layer, removing the aqueous solution, treating the oily layer with at least 4 volumes of propane for each volume of oil to form a precipitate, separating the precipitate from the remaining oil, distilling the remaining oil to separate the oil boiling below about 650° F. from a residual bottom fraction, dissolving the residual bottom fraction in a saturated hydrocarbon naphtha, treating the resulting solution with 98% sulfuric acid in an amount upward to about 100 pounds per barrel based on the residual bottom fraction, separating the acid sludge formed thereby, contacting the residual acidic solution with about 2 pounds of decolorizing clay per gallon of residual bottom at a temperature of approximately 85° F., separating the clay from said solution and distilling off the naphtha from said solution.

3. A process of preparing derivatives of an acid sludge which comprises treating at a temperature from 160° to 170° F. with water an acid sludge obtained by contacting cracked hydrocarbon naphthas with sulfuric acid to form a layer of aqueous solution and an oily layer, removing the aqueous solution, treating the oily layer with 4 to 5 volumes of propane for each volume of oil to form a precipitate, separating the precipitate formed thereby from the remaining oil, distilling the remaining oil to separate the oil boiling below 650° F. from a residual bottom fraction, dissolving the residual bottom fraction in a saturated hydrocarbon naphtha, treating the resulting solution with 100 pounds of 98% sulfuric acid per barrel based on the residual bottom fraction, separating the acid sludge formed thereby, contacting the residual acidic solution with 2 pounds of decolorizing clay per gallon of residual bottom at a temperature of approximately 85° F., separating the clay from said solution and distilling off the naphtha from said solution.

4. A process for preparing a drying oil which comprises treating with water an acid sludge obtained by contacting cracked hydrocarbon naphthas with sulfuric acid, removing an aqueous acid solution, treating the residual oil with a liquefied, normally gaseous hydrocarbon, separating the resulting precipitate, distilling the remaining oil, and recovering from the overhead fraction a crude drying oil boiling between about 520° and 650° F.

5. A process for preparing valuable derivatives from an acid sludge obtained by contacting cracked hydrocarbon naphthas with sulfuric acid which comprises treating the acid sludge with water to form a layer of aqueous acidic solution and an oily layer, removing the aqueous acidic solution, treating the oily layer with a liquefied, normally gaseous hydrocarbon to form a precipitate, separating the resulting precipitate from the remaining oil, distilling the remaining oil to remove constituents boiling up to about 650° F. from residual bottoms, subjecting the residual bottoms to a sulfuric acid treatment to form an acid sludge, removing the acid sludge, and neutralizing the remainder.

6. A process for preparing a drying oil from an acid sludge obtained by contacting cracked hydrocarbon naphthas with sulfuric acid which comprises treating said sludge with water within a few hours after its formation, removing the aqueous acid solution, treating the residual oil with a liquefied, normally gaseous hydrocarbon, separating the resulting precipitate, distilling the remaining oil, and recovering from the overhead fraction a crude drying oil boiling between about 520° and 650° F.

JERE C. SHOWALTER.
MEHEMET WIGGEN.